United States Patent [19]
Biester et al.

[11] 3,979,980
[45] Sept. 14, 1976

[54] APPARATUS AND PROCESS FOR PROTECTING MACHINERY

[75] Inventors: Robert E. Biester, Elmhurst; Eugene T. Balciunas, Chicago, both of Ill.

[73] Assignee: The Sherwin-Williams Company, Cleveland, Ohio

[22] Filed: Mar. 10, 1975

[21] Appl. No.: 556,769

[52] U.S. Cl. ................................. 83/13; 83/61; 83/62; 83/63
[51] Int. Cl.² ................................ B26D 5/28
[58] Field of Search ............... 83/61, 62, 63, 58, 13; 408/7, 13

[56] References Cited
UNITED STATES PATENTS
3,023,283   2/1962   Wintriss ........................... 83/61 UX FOREIGN PATENTS OR APPLICATIONS
842,578   5/1970   Canada ................................ 83/63

Primary Examiner—Willie G. Abercrombie
Attorney, Agent, or Firm—Fay & Sharpe

[57] ABSTRACT

An apparatus and process for protecting a press die and press frame from damage when stock has jammed therein. The apparatus includes a proximity sensor which senses metal entering the press, a proximity sensor to detect the stamped product, and a proximity sensor to detect the skeleton scrap metal left after the stamping. A press cycle detection sensor senses a cycle of the press and generates a timing pulse. Means for comparing signals generated by the proximity sensors is regulated by the timing pulse and includes a signal converter, a memory circuit, a signal comparator and a fault check operatively connected to one another. An output relay breaks the press circuit upon an appropriate signal.

The process of protecting a press die includes sensing the input to determine if stock is present, generating an electrical impulse and storing the signal in a memory. The presence of the stamped product and the resultant scrap are noted and similar signals generated. The output signals are also fed to memories. The movement of the press ram is monitored by means of sensor detecting rotation of the main press crankshaft. This sensor generates a timing signal and a fault check signal. If the stock is not present at one location during a predetermined time period, a fault check system signals the press to stop since it is an indication that stock is presumably jammed or backed up. After a fault check signal is generated and no fault signal is present, all input memories are reset and a new cycle is started.

17 Claims, 4 Drawing Figures

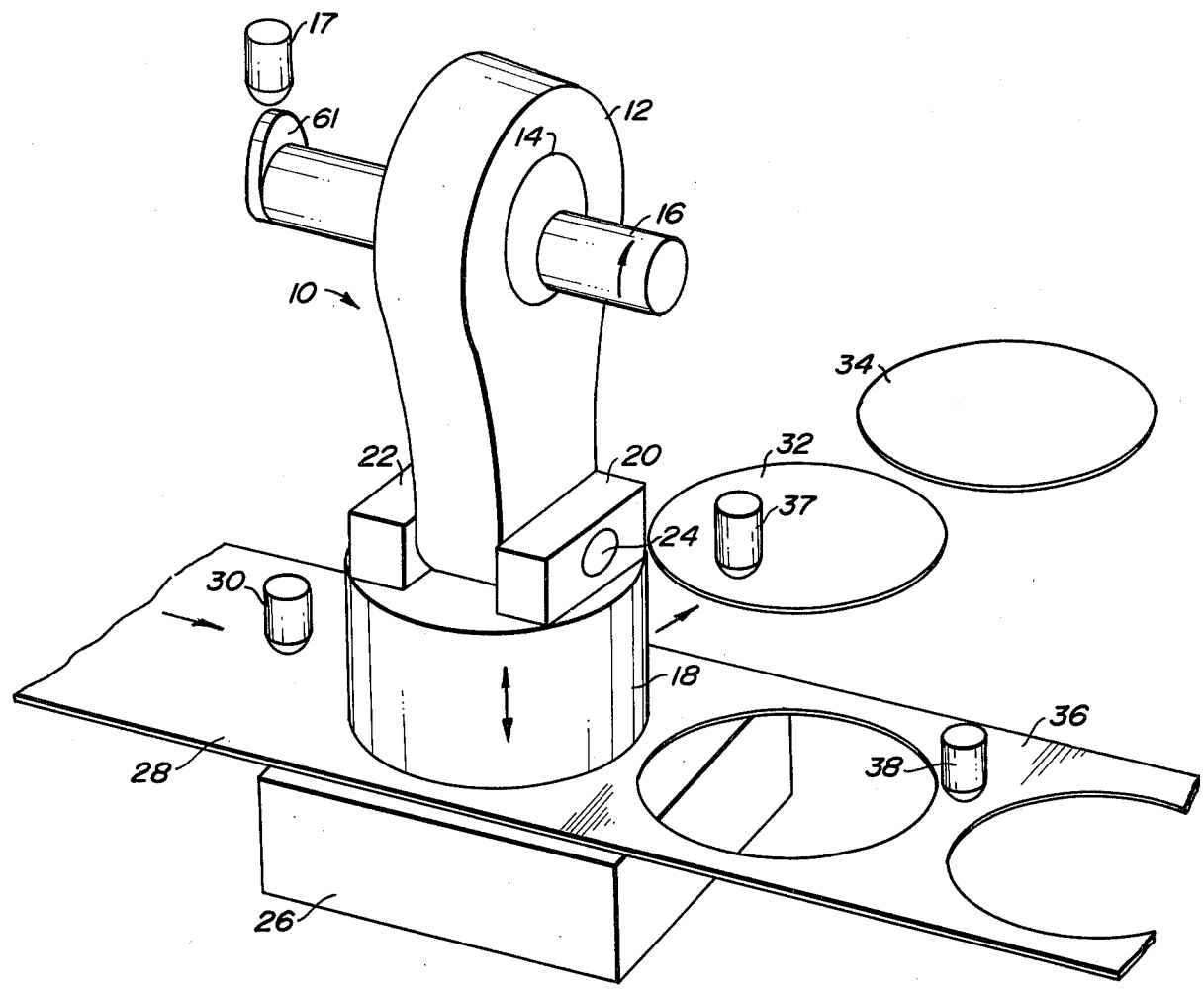
FIG. 1
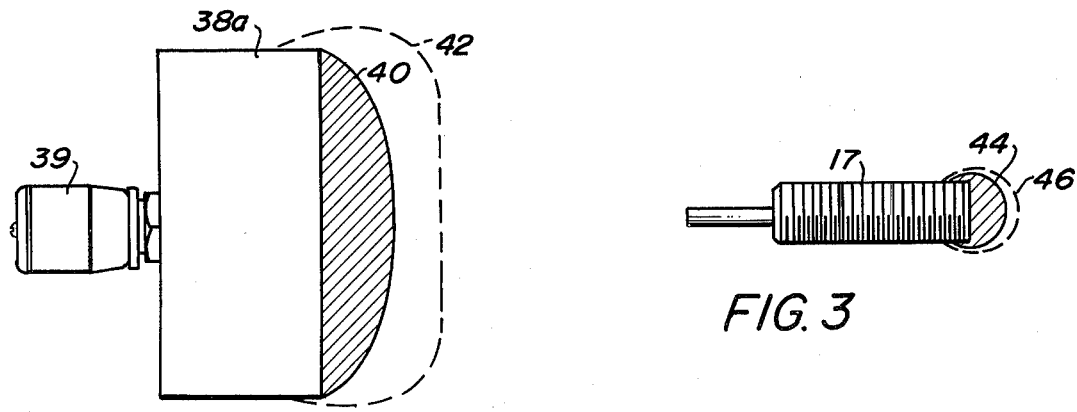
FIG. 2
FIG. 3

APPARATUS AND PROCESS FOR PROTECTING MACHINERY

BACKGROUND OF THE INVENTION

This invention relates to the automatic protection of machines having an input and output of stock from damage due to jamming of the stock. This system is designed to detect a jammed part in a machine, and in particular, a punch press before additional parts are formed, or malformed as the case may be, and before the machine is damaged.

In any process where there is a continuous or intermittent feed of stock, damage to highly expensive machinery and waste of stock is probable if the machine jams. Accordingly, it is highly advantageous to have a safety system which detects a malfunction and turns off the machine as quickly as possible. If the machine is a punch press, it is particularly important to have a protection system. The high forces and rapid motion of a press can cause considerable damage in a brief period of time if the machine malfunctions.

It is desirable for a protection system to work automatically for all modes of operation of the machine. That is, any manual operation of the protection system during start-up or stopping of the machine increases the chances of a mistake. This desirable and important advantage of automatic operation is not normally present since an output sensor does not observe anything during start-up until some stock has actually passed through the machine. Similarly, the output sees material for a short duration after the input has ceased. Thus, there are periods when the input and output are not seeing material simultaneously. Comparisons of the input and output must compensate for these transient situations if the system is to be automatic.

Machine protection has been the subject of previous devices but all such systems have deficiencies. Jensen U.S. Pat. No. 3,348,440 discloses a sequence control for an automatic machine but is highly elaborate and expensive. U.S. Pat. No. 3,122,796 recognizes a similar problem in a printing machine where accumulations of stock may cause damage. However, the patent utilizes a light-responsive electrical device which is not always the most desirable. Moreover, neither of the above-noted machines correlate the output material with the input material to determine if the machine is functioning correctly. Weiland U.S. Pat. No. 3,543,621 discloses the recognition that punch presses or similar machines may malfunction if jamming occurs. However, it also does not correlate the input and output of the press with a timing mechanism to coordinate the protection of the machine during operation. Moreover, the prior art does not appear to function automatically for all modes of machine operation.

This invention utilizes an apparatus and process which more fully monitors the functions of a punch press and reacts quickly to any malfunction. The utilization of sensors at the input and output, a timing signal, memory and comparators permit stoppage of the machine as quickly as possible in order to minimize damage to stock and to the machine itself. The memory, which correlates the input/output sensor impulses with a timing signal, is particularly advantageous since it makes a comparison of the various functions of the machine for all modes of transient and continuous operation.

SUMMARY OF THE INVENTION

An apparatus for protecting a cyclical machine from damage due to material jamming therein includes means for sensing the material including at least one input sensor and output sensor and a means for comparing electrical impulses generated thereby. A timing signal correlates the electrical inpulses with the cycles of the machine. The means for comparing includes a memory which holds an electrical impulse until it is transmitted on signal from the timing circuitry to a comparison circuit. Operatively connected to the means for comparing includes a means for stopping the machine if the means for comparing does not generate a proper signal.

The process for protecting the machine includes sensing the presence of unprocessed stock before entering the machine and generating a first electrical impulse therefrom. The first electrical impulse is subsequently stored in a memory. If stock is continuously moving through the machine and has not jammed, the output is sensed and a second electrical impulse is generated. A timing signal governing the memory permits the input and output electrical impulses to be compared in order to determine if there is material flowing through the machine. The machine is stopped if the proper signals are not generated.

BRIEF DESCRIPTION OF THE DRAWINGS

FIG. 1 is a schematic representation of a press die in the process of stamping out sections of stock;

FIGS. 2 and 3 illustrate schematic representations of proximity sensors; and

DETAILED DESCRIPTION OF THE DRAWINGS

Figure 4:
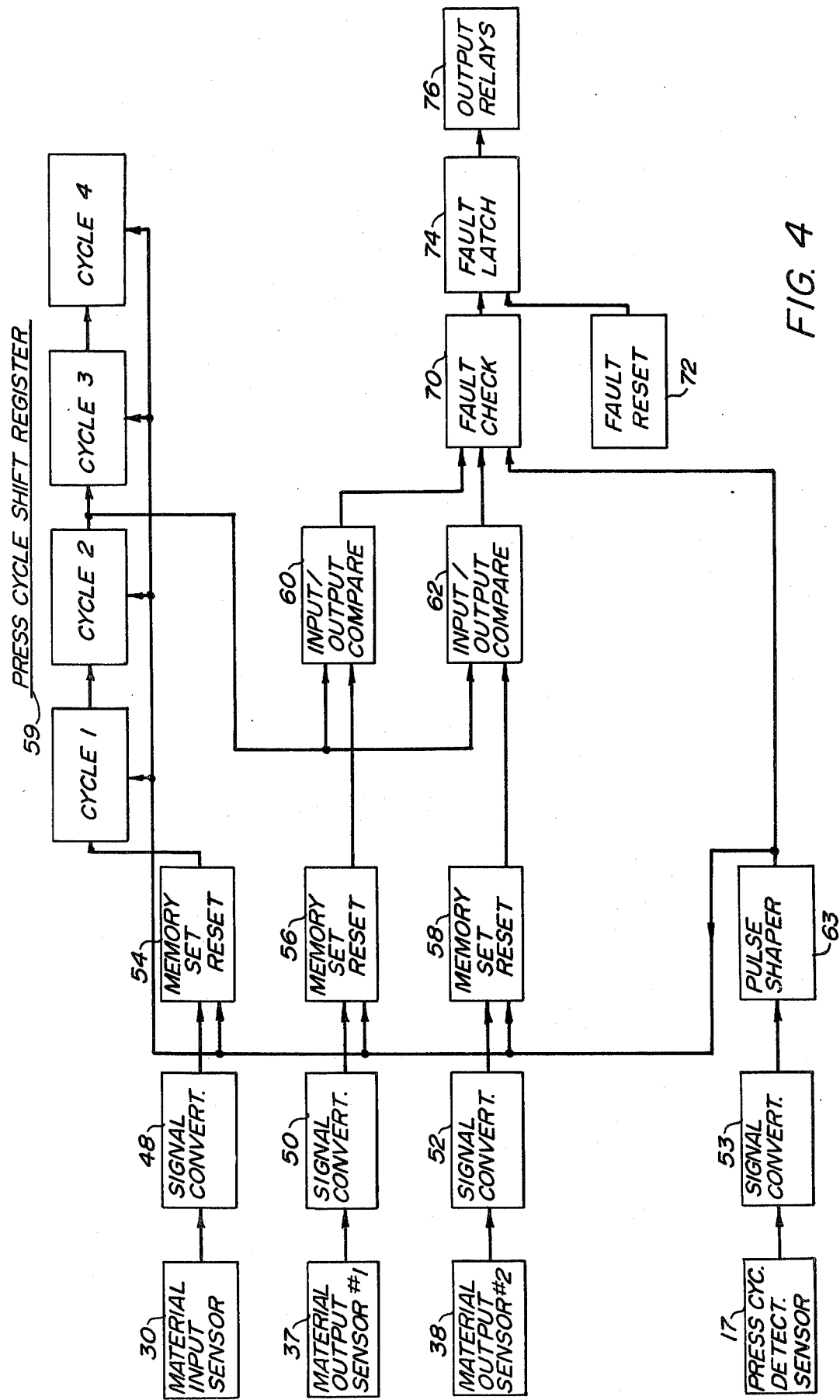
FIG. 4 is a block diagram of the apparatus and process of the invention.

It should be understood that this invention will be applicable to many different types of machines in which any type of stock is processed. For example, this invention can be utilized on single die, double die, and intermittent feed punch presses. For the sake of clarification and specificity, however, the apparatus and process will be described with respect to a punch press for stamping out metallic sections. In particular, as presently utilized, the invention is used on a Bliss No. 1831 Automatic Strip Feed Press and a Bliss No. C-35 O.B.I. Press. In schematic representations, FIG. 1 shows a machine 10 including a connecting rod 12 having an eccentric member 14 holding a crankshaft 16. A proximity sensor 17 (Peco Corporation Model No. C3041) is located in the area of the crankshaft 16 and gives an electrical impulse for each revolution. A ram 18, generally circular in cross-section and having a reciprocal motion, is rotatably mounted to the rod 12. Blocks 20 and 22 are journaled to secure a rotatably mounted shaft 24 which passes through an opening (not shown) in the rod 12. The ram 18 has a die on its bottom which is used to stamp out pieces from stock 28. A complementary block die 26 has an appropriate opening therein to accept the ram 18 as it passes through the stock. The stock 28 is fed into the machine 10 past a proximity sensor 30.

As the stock 28, which in this case is metal, progresses, the ram 18 stamps out circular products 32 and 34. A proximity sensor 37 is in the vicinity of and views the passing products 32 and 34. In practice, the proximity sensors are embedded in the slides or carriers for the stock or material 28. Photoelectric cells, limit switches and other detectors may be utilized instead of proximity sensors.

The waste product or skeleton 36 passes through the machine and is disposed. A proximity sensor 38 detects the passing of the skeleton 36.

The proximity sensors 30, 37 and 38 used to detect the presence of the input and output stock 28, 32, 34 and 36 are illustrated in FIG. 2. Proximity sensors 30 and 38 are Peco Model No. C-3040. Proximity sensor 37 is a Model No. C-3026. They are commercially available from the Peco Corporation. The proximity sensor works on an oscillator principal from a direct current power supply. A negative DC signal voltage is generated if no metal is in the sensing field. As metal enters the sensing field, the DC signal voltage increases toward the positive value. It is generally constructed of an all solidstate circuitry, epoxy encapsulated in an aluminum frame. The proximity sensor is shown schematically in FIG. 2 and has a frame 38a and a connector 39. A sensing field shown as 40 is generated at 0° to 72° F., whereas, a sensing field 42 is shown for higher temperatures of about 160° F.

FIG. 3 illustrates the press cycle detection sensor 17 which is similar in construction and working principal to that shown in FIG. 2. It works on an oscillator principal from a DC power supply and generates a negative DC signal if no metal is present and which turns positive as it detects metal. The sensing field at 0° to 72° F. is shown as 44 and the sensing field at the higher temperatures of about 160° F. is shown as 46.

The block diagram illustrated in FIG. 4 shows means for sensing the presence of stock which includes the material input proximity sensor 30 and output proximity sensors 37 and 38. The press cycle detection sensor 17 is operatively connnected to an analog to digital signal converter 53 which is a commercially available sensor input interface card from Peco Corporation, Model No. C-3285. The signal converter 48 changes the electrical impulse from the sensor 30 to a logic signal. Similar converters 50, 52 and 53 receive the output electrical impulses from the sensors 37, 38 and 17, respectively.

Means for comparing signals include one-bit memory units 54, 56 and 58 which are known flip-flop circuits with set/reset memory functions (Peco Corporation Model No. C-3313) which are operatively connected to the converters 48, 50 and 52, respectively. These memory units form a part of the means for comparing the input and output signals resulting from the sensors. Also included in the means for comparing includes comparison circuits 60 and 62 for comparing the input and output signals from the sensors once they have passed through the memories.

A press cycle shift register 64 is also included in the means for comparing and is basically a four-bit memory circuit which is a commercially available flip-flop memory from the Peco Corporation, Model No. C-3479. Input/output comparison circuits 60 and 62 are available from the same source, have a Model No. C-3478 and receive signals from the press cycle shift register and the one-bit memories.

Means for stopping the machine includes a fault check circuit 70 which is operatively connected to the input/utput comparison circuits 60 and 62 and is a commercially available two-input high threshold nand/gate from the Peco Corporation, Model No. C-3284. A fault manual reset circuit 72 of Peco Corporation, Model No. C-3296 is operatively attached to a fault latch 74 which is also connected to the fault check 70. The fault latch circuit 74 is a flip-flop circuit with set and reset memory function (Peco Corporation Model No. C-3313) and is used to trip an output relay 76 (Peco Corporation Model No. C-3032).

During the process of this invention, a strip of tin plate or other detectable metal is mechanically fed into the press die area. One part is punched during each stroke or cycle of the press and is ejected out of the forming die by a mechanical device. After the last punch on the strip is made, the strip skeleton 36 is mechanically ejected. During the process, the first operation of the system is a check for press operation. If the press is running, the system will receive an input signal from the press cycle detection sensor 17. A mechanical indicator commonly referred to as a timing flag (cam) 61 is attached to the press crankshaft and passes the press cycle detection sensor with each rotation. This detection creates a timing signal for the circuitry. As indicated earlier, the timing pulse is shaped by a pulse shaper 63 and performs three (3) functions. First, it generates a fault check signal which is transmitted to the fault check circuit 70; second, it advances the press cycle shift register one stage; and thirdly, it resets the three one-bit memories 54, 56 and 58. At this point, there have been no other input signals and nothing occurs.

As stock 28 starts through the machine 10, the material input sensor 30 detects it. A signal is generated by sensor 30 and converted into a logic signal by converter 48. This signal is immediately stored in the one-bit memory circuit 54.

In the next cycle of the crankshaft 16, the press cycle detection sensor 17 detects another press cycle. It generates a fault check signal for the fault check circuit 70. Since no input or output signal has reached fault check 70, no fault is noted. The press cycle detection sensor simultaneously advances the press cycle shift register 59 thus moving the signal from memory 54 to the first position in the shift register 59. It also resets the three one-bit memories 54, 56 and 58.

As the crankshaft 16 rotates again (cycle 2), the number one material output sensor 37 detects an ejected part 34. The electrical impulse generated by the number one material output sensor 37 is converted into a logic signal by the converter 50 and is transmitted to the one-bit memory circuit 56. The output signal of this memory circuit is put into the comparison circuit 60. The comparison circuit 60 compares the output of the memory circuit and the output of the input sensor 30 through the press cycle shift register 59. That is, the signal from the input sensor is stored for two cycles of the machine and then sent to the comparison circuit 60. Since both outputs are present, that is, there is material at the input and the output, there is no signal generated from the comparison circuit 60 and no fault is noted.

The same type of operation is conducted by the circuitry with respect to the number two material output sensor 38 which detects the skeleton 36.

The same sequence of events continues for every cycle of the press until an incoming strip is no longer detected. At this point, the press cycle detection sensor detects the cycle, the timing pulse generates a fault check signal, advances the press cycle shift register one stage and resets the one-bit memory. The input and output are compared for two more cycles.

It is significant that the comparison circuits 60 and 62 do not receive any signals and thus do not generate indications of a fault during the initial two cycles of the machine. In this manner, the machine is a completely automatic safety device during starting up of the machine. The safety system compensates for the transient time when material is sensed at the input but none is sensed at the output. During operation, there is a continuous two-cycle delay from the signals generated by the input sensor until they are compared with the output from the number one and number two output sensors. The signals are generally digital in form and thus there is a signal for each and every individual piece that is punched from the press die. In this manner, the machine is completely automatic during the continuous operation of the machine.

It should be understood that while the press cycle shift register is a four-bit memory circuit, only two are utilized in the above-noted and described process. It is completely within the capability of this system, however, to vary the time, that is, the place and the number of cycles that have elapsed when the input signals are compared with the output. Depending upon the placement of the input and output sensors, the comparison can be made after any one of the cycles noted in FIG. 4.

When input stock is stopped, because of the two-cycle delay in comparing the input and output electrical impulses, the last piece through the machine will be checked normally. That is, the last piece of material will generate a signal which will not be placed in the comparison circuit until two cycles later. After the last piece of material is monitored, there will be no additional input or output material signals transmitted to the comparison circuit and thus no fault will be noted. In this way, the safety system is also completely automatic during shutting down of the machine or input stock stoppage.

It is the combination of the press cycle detection sensor along with the other components which make the protection system completely automatic and thus an improvement over the prior art. It should also be understood that variations in the design and components will be obvious to those skilled in the art but such changes are included within the scope of this invention.

We claim:

1. An apparatus for protecting automatically a cyclical machine from damage due to jamming, the machine having an input for unprocessed stock and at least one output for processed stock comprising:
   an input sensor which detects the presence of the unprocessed stock and generates a first electrical impulse in response thereto;
   an output sensor which detects the presence of the processed stock and generates a second electrical impulse in response thereto;
   timing means to coordinate the comparison of the first and second electrical impulses with the cycles of the machine;
   means for comparing the first and second electrical impulses for a given piece of stock to determine that it is continuously moving through the machine and that the machine has not jammed, the means for comparing being operatively connected to the input sensor, output sensor and timing means;
   means for stopping the machine if the means for comparing does not generate a proper signal, the means for stopping being operatively connected to the means for comparing.

2. The apparatus of claim 1 wherein the timing means is a sensor which detects each cycle of the machine and generates an electrical impulse in response thereto.

3. The apparatus of claim 2 wherein the means for comparing includes a press cycle shift memory which holds the first electrical impulse during a predetermined number of cycles of the machine.

4. The apparatus of claim 3 wherein the means for comparing further includes a comparison circuit which receives and compares the first electrical impulse and second electrical impulse to determine if processed stock is located at the output after a predetermined number of cycles after stock has been detected at the input.

5. The apparatus of claim 4 wherein the means for stopping further includes a fault check circuit operatively connected to the comparison circuit which signals when metal is not present at the output of the machine when it is present at the input.

6. The apparatus of claim 5 wherein the cycle memory includes a press cycle shift register which is at least a two-bit memory circuit.

7. The apparatus of claim 6 wherein the means for comparing further includes means for converting the first and second electrical impulses to logic signals so that the signals may be stored in the memory circuit.

8. The apparatus of claim 7 wherein the timing means is a proximity sensor which generates a signal to the fault check and advances the press cycle shift register.

9. The apparatus of claim 8 wherein the means for comparing further includes a one-bit memory circuit operatively connected to the press cycle shift register, which stores the first electrical impulse for one cycle.

10. The apparatus of claim 9 wherein the machine is a press die having a ram which cooperates with a complementary die block to punch sections out of the stock which is metal.

11. The apparatus of claim 10 wherein the input and output sensors are proximity sensors which detect metal.

12. The apparatus of claim 11 wherein a second output sensor is utilized to detect scrap metal after processing, the second output sensor generating a third electrical impulse, a second one-bit memory for storing the third electrical impulse until it is compared with the first electrical impulse;
   a second comparison circuit which is operatively connected to and receives signals from the one-bit memory and the press cycle shift register.

13. A process for protecting automatically a cyclical machine which processes unprocessed stock having an input of unprocessed stock and at least one output of processed stock comprising:
   sensing the presence of the unprocessed stock before entering the machine with a first sensor;
   generating a first signal if stock is present;
   storing the first signal in a memory;
   monitoring the machine cycle;
   sensing the presence of stock after it has been processed with a second sensor;
   generating a second signal from the second sensor after a predetermined number of cycles;
   comparing the signals from the first sensor and second sensor to determine the presence of input stock and processed stock in order to determine that stock is continuously moving through the machine and the machine has not jammed;

stopping the machine if the proper electrical impulses are not generated by the first and second sensor.

14. The process for protecting the machine of claim 13 further comprising sensing the presence of unprocessed stock with a proximity sensor having a field which is sensitive to the presence of the stock which is metal.

15. The process for protecting the machine of claim 14 further comprising sensing the presence of processed stock with a proximity sensor having a field which is sensitive to the presence of the processed stock.

16. The process of protecting the machine of claim 15 wherein processing the stock includes stamping a piece of metal out of a strip.

17. The process of protecting the machine of claim 16 which further includes sensing the presence of remaining scrap metal with a proximity sensor generating a signal and comparing it with the signal from the input sensor after a predetermined number of cycles.

* * * * *